United States Patent Office 3,141,034
Patented July 14, 1964

3,141,034
PRODUCTION OF UNSATURATED NITRILES
Lawrence J. Krebaum, Texas City, Tex., assignor to Monsanto Company, St. Louis, Mo., a corporation of Delaware
No Drawing. Filed Jan. 3, 1961, Ser. No. 79,973
5 Claims. (Cl. 260—465.9)

The present invention relates to a new method for preparing organic unsaturated nitriles. More particularly, it relates to the preparation of unsaturated nitriles by the reaction of acetonitrile with hydrocarbons.

According to the invention, hydrocarbons such as $C_2$ to $C_4$ olefins and acetylenes are reacted with acetonitrile at temperatures within the range from about 600° C. to about 1000° C. to produce a reaction mixture containing acrylonitrile and/or crotononitrile. In addition, in the reaction using acetylenes, cyanoacetylene or propargyl nitrile is also obtained as a product of the reaction. In the preferred embodiment of the process, a gaseous mixture of acetonitrile and the hydrocarbon together with an inert diluent gas if one is desired is continuously passed through a reaction zone heated to reaction temperature at a rate such that the mixture remains therein for the desired reaction period. The gases issuing from the reaction zone are quenched as rapidly as possible and the unsaturated nitriles are recovered by conventional condensation and fractional distillation techniques.

The invention is illustrated in the following example which, however, is not to be construed as limiting it in in any manner whatsoever.

EXAMPLE 1

The experimental apparatus was comprised of a reactor consisting of empty "Vycor" (96% silica) tube having an effective length of 20 cm. disposed within a muffle furnace together with inlet and outlet manifolds, a vaporizer for the acetonitrile with the required accessory lines, a mixing chamber for the reactant gases, and a product gas receiver. Prior to the run, the system was warmed up while argon was passed through it. Acetonitrile and hydrocarbon vapors were fed through rotameters into the mixing chamber and then passed through the reactor which had been heated to the desired temperature. The effluent gas from the reactor was collected in a heated receiver from which it was exhausted into a sample bomb. Reaction times in the reactor were varied by using tubes of various diameters, by changing feed rate, or by adding an inert diluent such as argon to the reaction mixture. A series of runs was made following this procedure using different hydrocarbons under various conditions of temperature, reactant feed ratios, reaction time, etc. Gas samples were obtained and analyzed by means of a mass spectrometer. To obtain realistic values for the higher boiling products, the sample bomb and the spectrometer inlet system were heated. Analyses were expressed on a mole percentage basis. Yields calculated from the analytical data under the various conditions are recorded in Table I.

Table I

| Run No. | Hydrocarbon Reactant | Temp., °C. | Reaction Time (Sec.) | Mole Ratio, AcN:HC:A [1] | Yields Based on AcN (Percent) | | |
|---|---|---|---|---|---|---|---|
| | | | | | Acrylonitrile | Crotononitrile | Propargyl Nitrile |
| 1 | Ethylene | 600 | 0.33 | 2:1:0 | 45.4 | | |
| 2 | do | 650 | 0.33 | 2:1:0 | 35.0 | | |
| 3 | do | 700 | 0.30 | 4.6:1:0 | 24.0 | 13.1 | |
| 4 | do | 700 | 0.3 | 2.2:1:0 | 18.3 | 12.8 | |
| 5 | do | 700 | 0.4 | 0.4:1:0 | 14.7 | 10.3 | |
| 6 | do | 700 | 3.1 | 1.7:1:0 | 24.4 | 9.2 | |
| 7 | do | 750 | 0.4 | 0.9:1:0 | 22.6 | 7.0 | |
| 8 | Propylene | 650 | 0.6 | 0.6:1:0 | 5.7 | 27.2 | |
| 9 | do | 700 | 0.7 | 0.4:1:0 | 18.5 | 24.6 | |
| 10 | do | 705 | 0.6 | 0.5:1:0 | 15.4 | 25.1 | |
| 11 | do | 705 | 0.6 | 1.2:1:0 | 15.0 | 23.6 | |
| 12 | do | 710 | 0.5 | 2.5:1:0 | 15.0 | 7.7 | |
| 13 | do | 750 | 0.5 | 0.7:1:0 | 17.2 | 18.9 | |
| 14 | do | 850 | 0.2 | 0.6:1:2.8 | 10.5 | 10.8 | |
| 15 | Acetylene | 760 | 0.3 | 9.2:1:5.7 | 2.5 | 13.4 | 3.2 |
| 16 | do | 810 | 0.5 | 7:1:14 | 18.4 | 19.6 | 11.2 |
| 17 | do | 855 | 0.5 | 7:1:21 | 26.9 | 0.0 | 20.9 |
| 18 | do | 905 | 0.4 | 10:1:20 | 32.3 | 6.8 | 23.2 |

[1] Acetonitrile:hydrocarbon:argon.

Variations in procedure and reaction conditions from those given in the example may be made without departing from the scope of the invention. For example, the reaction may be carried out in a tubular reactor of quartz, porcelain or any other refractory material which is non-catalytic and capable of withstanding the temperatures employed as well as in the silica reactor exemplified. The reactant gases can, if desired, be passed through a series of reaction zones heated to reaction temperature, the mixture being cooled as it issues from each reactor to recover the desired reaction products therefrom. Unreacted feed materials can then be recycled.

While the reaction can be effected at temperatures as low as 600° C., operations at this low temperature are somewhat impractical because of the low conversions obtained. Likewise, while temperatures above 1000° C. can be used, the practical upper limit for the reaction is at the level of 1000°. The preferred temperatures within the broad reaction temperature range of 600° C. to 1000° C. will depend to some extent upon the hydrocarbon reactant and upon the distribution desired in the reaction product. It will be observed from the data in Table I that the proportions of the various unsaturated nitriles in the reaction mixture can be varied by varying the reaction conditions. With these considerations in mind, preferred temperatures for reaction of the olefins with acetonitrile lie in the range from about 700° C. to about 800° C. With acetylene as the reacting hydrocarbon, preferred temperatures are higher, i.e., from about 800° C. to about 1000° C.

Reaction time, i.e., the time during which the reaction mixture is maintained in the reaction zone at reaction temperature, varies with the particular temperature employed. Generally, a decrease in temperature requires an increase in reaction time and conversely, an increase in temperature will necessitate a shorter reaction time. Reaction times from about 0.01 second to about 5 seconds can be satisfactorily employed over the broad temperature range from 600° C. to 1000° C. In the preferred temperature range for the olefin reactants, reaction times from about 0.1 to 5 seconds are preferably employed with optimum results being obtained at reaction times from about 0.2 second to about 3 seconds. When acetylenes are reacted at the preferred temperatures, shorter reaction times from 0.01 second to 1.0 second are preferred with optimum results being obtained at reaction times of 0.1 to 0.5 second.

Th pressure employed is preferably atmospheric but operation at either subatmospheric or superatmospheric pressure is feasible.

A wide range of reactant ratios can be employed. Mole ratios of acetonitrile to hydrocarbon from 1:10 to 10:1 can be employed when the hydrocarbon is an olefin and in this range mole ratios of 1:3 to 3:1 are preferred. When acetylenes are reacted with acetonitrile, the nitrile or a mixture of the nitrile with an inert diluent gas must be employed in excess for practical operations because of the greater reactivity of acetylene. Mole ratios of nitrile to acetylene or nitrile plus inerts to acetylene of 2:1 to as high as 20:1 can be used but preferred ratios are those in the range from about 2:1 to 10:1.

Inert gaseous diluents can be present in the reaction mixture if desired and as pointed out just above are very useful in controlling the reaction when acetylenes are employed. Nitrogen, argon and the like are suitable. Also acetonitrile itself can be employed in excess as a practical diluent. The proportions of inert diluent are limited only by practical considerations.

In addition to the hydrocarbons exemplified, n-butylene, isobutylene, and substituted acetylenes such as methyl acetylene, phenyl acetylene, ethyl acetylene and the like can be employed in the process of the invention.

Recovery of the different nitrile products can be effected by low temperature condensation of the effluent gas mixture followed by fractional distillation of the liquid condensate in a conventional manner. Unreacted acetonitrile and hydrocarbon can be recycled to the reaction zone if desired.

What is claimed is:

1. A method for the preparation of aliphatic unsaturated mononitriles which consists essentially of reacting acetonitrile with a hydrocarbon chosen from the class consisting of $C_2$ to $C_4$ monoolefins and acetylene at a temperature in the range from about 600° C. to about 1000° C.

2. A method for the preparation of aliphatic unsaturated mononitriles which consists essentially of reacting acetonitrile with an olefin having from 2 to 4 carbon atoms at a temperature within the range from about 700° C. to about 800° C.

3. A method for the preparation of an unsaturated nitrile chosen from the class consisting of acrylonitrile and crotononitrile which consists essentially of reacting acetonitrile with ethylene at a temperature in the range from about 700° C. to about 800° C.

4. A method for the preparation of an unsaturated nitrile chosen from the class consisting of acrylonitrile and crotononitrile which consists essentially of reacting acetonitrile with propylene at a temperature in the range from about 700° C. to about 800° C.

5. A method for the preparation of an unsaturated nitrile chosen from the group consisting of acrylonitrile, crotononitrile and propargyl nitrile which consists essentially of reacting acetonitrile with acetylene at a temperature in the range from about 800° C. to about 1000° C.

References Cited in the file of this patent

UNITED STATES PATENTS

| | | |
|---|---|---|
| 2,496,659 | Denton et al. | Feb. 7, 1950 |
| 2,745,864 | Dixon | May 15, 1956 |
| 2,757,192 | Jenner | July 31, 1956 |
| 2,964,505 | Drysdale | Dec. 13, 1960 |
| 3,056,826 | Fierce et al. | Oct. 2, 1962 |
| 3,057,906 | Fierce et al. | Oct. 9, 1962 |

OTHER REFERENCES

Bergmann, "Acetylene Chemistry," 1948, page 80.